Figure 1:
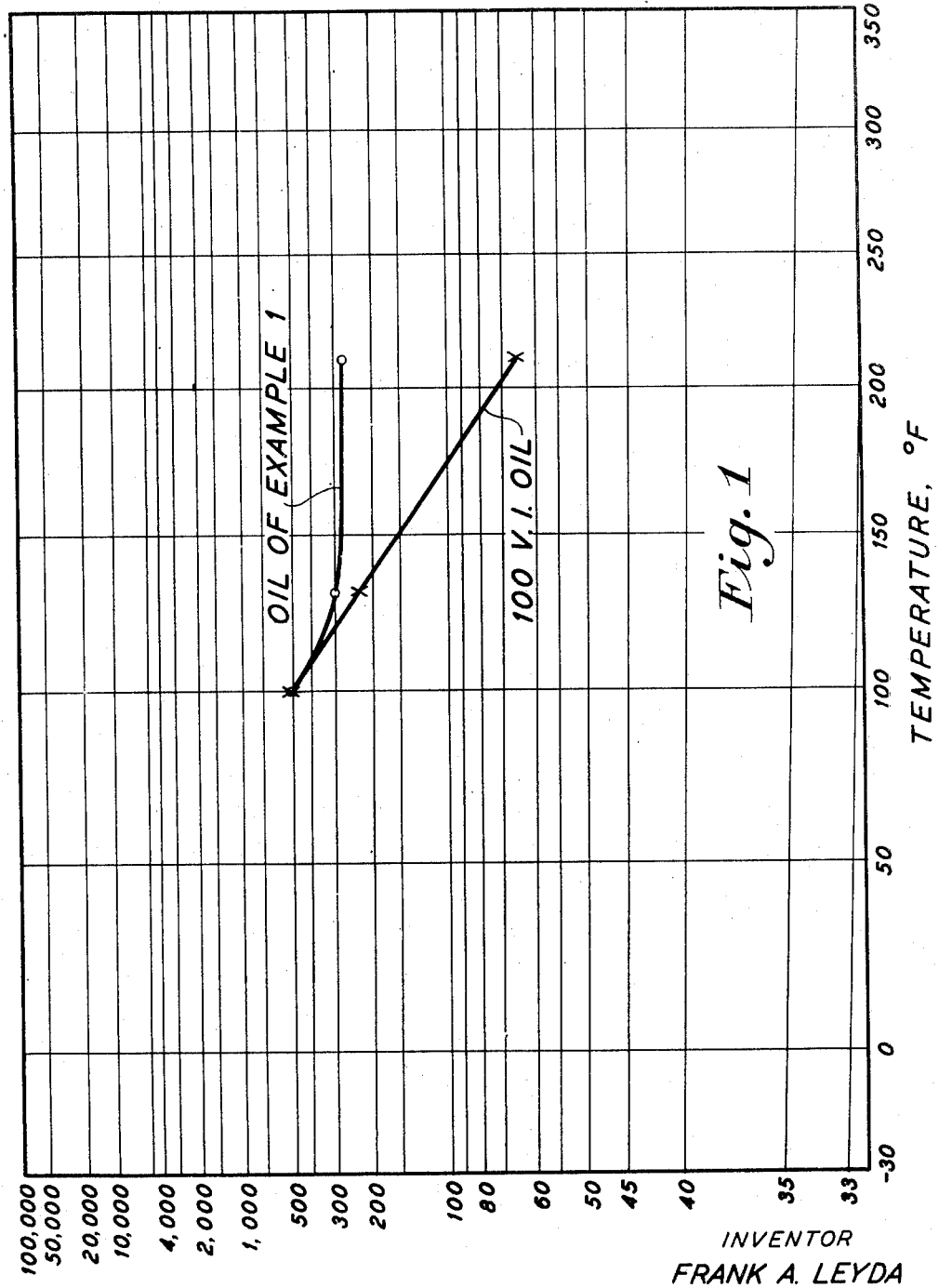
Figure 2:
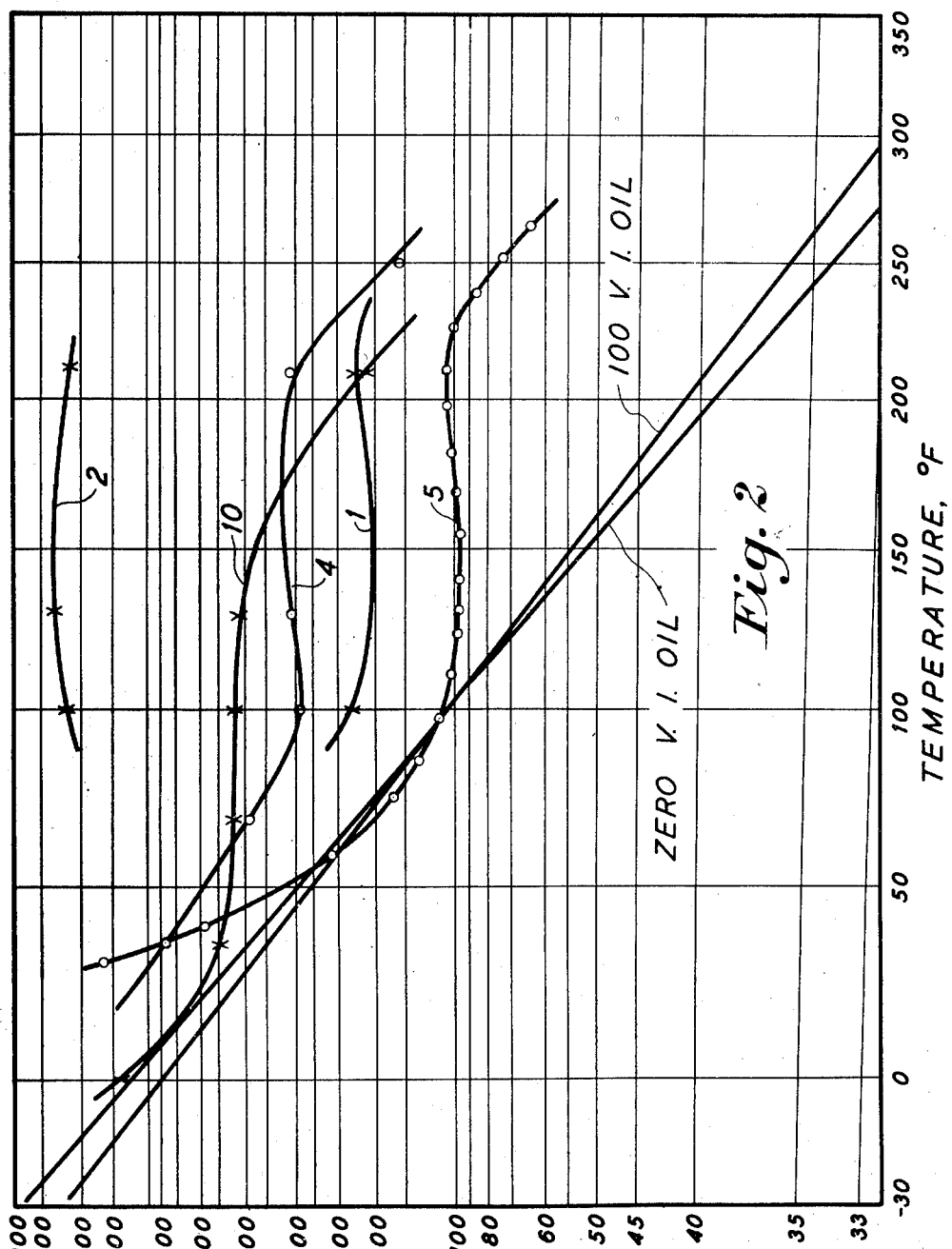
Figure 3:
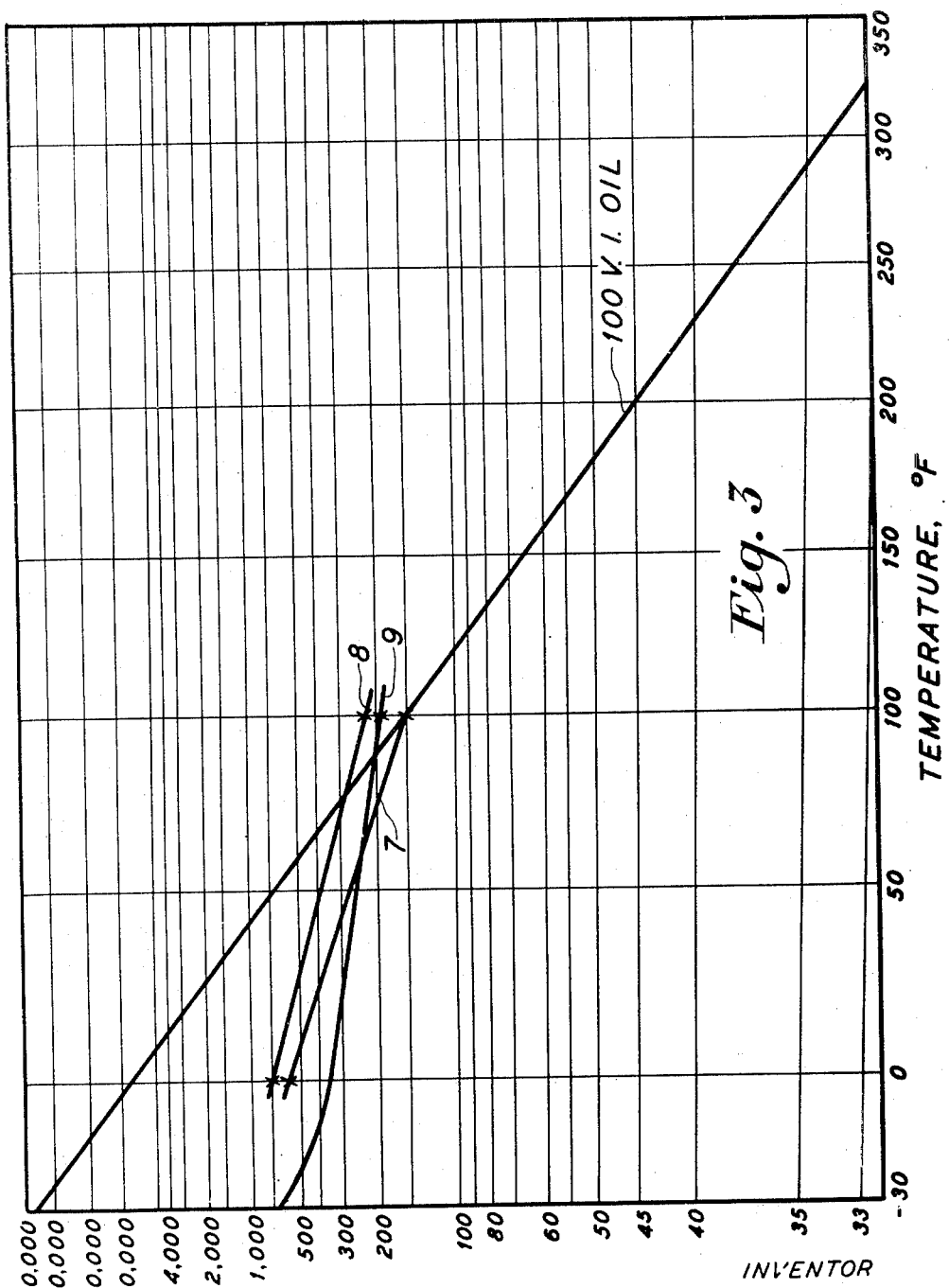

Patented Nov. 29, 1949

2,489,300

UNITED STATES PATENT OFFICE 2,489,300

LUBRICANTS AND THE LIKE

Frank A. Leyda, Richmond, Calif., assignor to California Research Corporation, San Francisco, Calif., a corporation of Delaware Application October 25, 1946, Serial No. 705,699

10 Claims. (Cl. 252—36)

This invention relates to certain new and useful compositions having a hydrocarbon oil as the basic component and containing dispersed therein a high molecular weight, polymeric material having recurring polar substituents.

More particularly, the invention relates to liquid lubricating compositions (i. e., liquid and freely flowing at normal atmospheric temperatures) comprising mineral lubricating oil as the predominant component and containing stably dispersed therein a mineral oil-insoluble, high molecular weight polymeric material having recurring polar substituents, such lubricating composition being characterized by relatively small change of viscosity over a wide range of temperatures.

It is an object long sought in the art to produce lubricants and the like which exhibit little change of viscosity over a wide range of temperatures. Thus, in any application where a lubricant, insulating oil or the like is subjected in use to wide variations of temperature, it is desirable that the lubricant, insulating oil or the like have not too high a viscosity at the lower temperatures nor too low a viscosity at the higher temperatures. Thus, by way of example, a transformer oil, used to insulate and conduct heat away from the windings of a transformer, may be subjected to sub-zero temperatures in winter and to high temperatures during hot weather and while the transformer is dissipating a large amount of heat. If the oil becomes too viscous, it will not conduct heat readily. Hydraulic oils may be subjected to temperatures much below normal atmospheric (as in aircraft flying at high altitudes) or to elevated temperatures. If the oil becomes unduly viscous, it becomes sluggish and less responsive to mechanical pressure. In the operation of any machinery where the oil may become cold while the machinery is at rest and may become hot while the machinery is in operation, the oil may become so viscous and sluggish at low temperatures as to impede starting and acceleration and to cause excessive wear, or it may become so thin at high temperatures as not to provide sufficient "oiliness" for efficient lubrication.

As applied to hydrocarbon oils, these ends have been fulfilled in some measure in the past by various expedients, such as selecting base stocks (paraffinic) having high viscosity index (V. I.), refining oils to remove constituents which impart low V. I., and adding V. I. improvers. Most such means have fallen far short of the desired goal of a lubricant exhibiting relatively little viscosity change over a wide range of temperatures; the slope of the viscosity-temperature curve (reflecting change of viscosity with temperature) is reduced but not to anything approaching zero. Also, those methods which rely upon selection of base stock exclude a large class of hydrocarbon oils (aromatic, naphthenic, etc.), which, except for their low V. I., have good properties as lubricants, insulating oils, etc. Those methods relying upon refining suffer loss of valuable hydrocarbon and non-hydrocarbon constituents (removed by the refining) and entail the use of expensive treating plants and chemicals.

It is an object of this invention to provide lubricants, insulating oils, hydraulic oils, castor machine oils, "Vistac" oils, drilling oils, gear lubricants, dash pot oils, scientific instrument lubricants and the like which exhibit relatively little change of viscosity over a wide range of temperatures.

It is a further object of the invention to provide a means whereby, starting from a hydrocarbon base stock and certain additive materials to be incorporated in the base stock in small amount, an oil can be produced exhibiting relatively little change of viscosity over a wide range of temperatures, which range of temperatures may be in the higher, lower or intermediate regions of temperature, as desired.

It is a particular object of the invention to provide means whereby a wide variety of petroleum lubricating oils, and in particular, aromatic or naphthenic type petroleum lubricating oils, can be modified to produce oils exhibiting relatively small change of viscosity over a wide range of temperatures.

It is a further particular object of the invention to provide lubricants and the like which, over an extended range of temperature, exhibit an increase in viscosity with rise of temperature.

These and other objects of the invention will be apparent from the ensuing description and the appended claims.

In accordance with the invention, a hydrocarbon oil of suitable viscosity is selected as the base stock, and in this is stably dispersed a high molecular weight, polymeric material having recurring polar substituents, such polymeric material being substantially insoluble in the base stock at ordinary atmospheric temperatures, i. e., at about 77° F.

The hydrocarbon oil may have a viscosity of about 30 S. S. U. at 100° F. to 200 S. S. U. at 210° F., although oils of lower or higher viscosity may be required upon occasion. Preferably, this oil has a viscosity of 30 to 110 S. S. U. at 100° F. Petroleum and non-petroleum, natural and synthetic oils may be used; e. g., petroleum distillates from paraffinic, naphthenic, aromatic or mixed base crude petroleums, ranging from gas oils to cylinder oils; olefin polymers such as polypropylenes and polybutenes; amyl naphthalene; the lubricating fractions from synthetic petroleums (Fischer-Tropsch process, etc.), etc. However, petroleum lubricating oils are preferred, and of these the more aromatic type (aniline point about 130°-160° F.) are found to be most advantageous.

The preferred polymeric materials are ethers of cellulose with aliphatic alcohols of one to six carbon atoms. Such ethers are ordinarily made from mercerized cellulose and alkyl halides, and the phrase "ethers of cellulose with aliphatic alcohols" is used herein merely for convenience of description. Among these ethers, ethyl cellulose of 45% or higher ethoxyl content has been found to be most advantageous. Methyl, propyl, butyl, amyl and hexyl cellulose ethers may be used instead of ethyl cellulose, and these may vary widely in alkoxyl content; or mixed ethers, such as ethyl propyl cellulose, may be used.

Less desirably, but still within the operative limits of the invention, other polymeric materials of the class above indicated may be used in place of or in conjunction with a cellulose ether; e. g., cellulose esters, such as cellulose valerates, cellulose laurates; alkyd resins having only slight solubility in mineral lubricating oil; polyamides of the more oil-soluble type and which are condensation products of high molecular weight dibasic acids (such as sebacic acid) and high molecular weight diamines (such as decamethylene diamine); vinyl type polymers such as amyl ethers of polyvinyl alcohol and esters of polyvinyl alcohol with high molecular weight fatty acids; and acrylic esters such as butyl methacrylate. Those polymeric materials having recurring hydroxyl, substituted hydroxyl or carbonyl groups in the molecule are preferred.

The polymeric material should be such as is insoluble or sparingly soluble in the hydrocarbon base oil, such as petroleum lubricating oil, at ordinary atmospheric temperatures, and it should have a molecular weight sufficient that, when the polymer dissolves in the oil by reason of the application of heat, it will increase the viscosity of the oil substantially. Also, the polymeric material should be of thermoplastic character.

As stated, the polymeric material is stably dispersed in the hydrocarbon base oil. This is advantageously accomplished by the use of a dispersing agent, examples of which are oil-soluble polyvalent metal aluminum soaps such as aluminum oleate, aluminum stearate, aluminum naphthenate, aluminum soaps of cocoanut oil fatty acids, aluminum soaps of hydrogenated fish oil fatty acids, and mixed soaps such as a 50–50 mixture of aluminum oleate and aluminum stearate. These aluminum soaps may be normal soaps (aluminum trioleate, etc.) or basic soaps (aluminum dioleate, etc.). Similarly, normal and basic soaps of magnesium may be employed.

The compositions of the invention as thus far described comprise a hydrocarbon base oil, a polymeric material and a dispersing agent. Advantageously, however, the compositions of the invention also comprise a fourth component, herein called a stabilizing agent. The stabilizing agent functions to inhibit separation and settling out of the ingredients upon prolonged exposure to elevated temperatures. A wide variety of materials may be used for this purpose, e. g., hydroxy compounds such as: low molecular weight polyhydric alcohols (e. g., ethylene glycol, glycerol); fatty acid esters of the same (e. g., glyceryl monostearate, glyceryl monoricinoleate); weak, oil-soluble fatty acids such as lauric, oleic, ricinoleic, abietic and naphthenic acids; stronger, oil-soluble acids such as petroleum sulfonic acids and half esters of dibasic acids such as phthalic and maleic acids with $C_{11}$ to $C_{16}$ alcohols (e. g., lauryl acid maleate, lauryl acid phthalate); oil-soluble phenolic compounds such as tertiary butyl catechol; and trimethylol propane. Also, high molecular weight ketones may be used, such as 16-hentriacontanone, and high molecular weight aliphatic acid amides, such as lauric and octadecanoic amides. These stabilizing agents have active hydrogen in the molecule and, except in the case of ethylene glycol and glycerol, they also contain a long chain aliphatic or cycloaliphatic group or several short chain aliphatic groups.

The compositions of the invention may also contain a corrosion and/or oxidation inhibitor; e. g., cetyl mercaptan, α-naphthylamine or Paranox 441 (trade-name of a product of Stanco, Inc., Chemical Products Division, New York, N. Y., applied to the tertiary butyl ether of 2-tert.butyl-4-methyl phenol).

The above ingredients may be used in widely varying proportions, choice of proportions in any given instance depending upon a variety of factors such as the nature of the hydrocarbon base oil, the polymeric material and the stabilizer; solubility of the polymeric material in the oil, etc. Generally, in 100 parts by weight of finished composition, the hydrocarbon base oil will constitute about 85 to 99 parts, 92 to 98 parts being preferred; the polymeric material, about 0.5 to 6 parts, 0.5 to 3 parts being preferred; the dispersing agent, about 0.5 to 6 parts, 2 to 5 parts being preferred; the stabilizing agent, about 0.05 to 0.3 part, 0.1 to 0.2 part being preferred; and the corrosion and/or oxidation inhibitor, about 0.1 to 0.2 part.

The manner of compounding these ingredients to produce the compositions of the invention is likewise susceptible to considerable variation. Preferably, the dispersing agent is first dissolved in the hydrocarbon base oil by mixing the two together and heating, after which the stabilizer and corrosion or oxidation inhibitor are dissolved in the oil-dispersing agent solution by heating and stirring. Finally, the polymeric material is dispersed in the above mixture by heating and stirring, after which the product is allowed to cool. This particular sequence of steps is most advantageous, in that a superior product, having a more nearly level viscosity-temperature curve, is obtained. However, other compounding procedures may be used.

It is an important object of this invention to provide a means of producing lubricants and the like having a relatively flat viscosity-temperature curve (hereinafter referred to as a V-T curve) in a selected range of temperatures. For example, if the problem is to produce a lubricant having a relatively flat V-T curve from 0° to 100° F,. or 100° to 210° F., it is an object of the invention to provide a means of producing such a lubricant.

This object can be accomplished in different ways. Thus, I have discovered that by choosing a hydrocarbon base oil and a polymeric material such that the polymeric material is relatively highly soluble in the oil, and dispersing the polymeric material in the oil, a composition is produced having a flattened V-T curve in a region of lower temperatures; whereas, if the oil and polymeric material are so chosen that the polymeric material has relatively low solubility in the oil, a composition is produced (upon dispersing the polymeric material in the oil), having a flattened V-T curve in a region of a higher temperatures.

By "high solubility" of polymeric material in hydrocarbon oil is meant, not high solubility in the absolute sense, but high solubility relative to polymeric materials of lower solubility. All of the polymeric materials of the invention are characterized by low oil solubility in the absolute sense. In this connection, it is preferred to use polymeric materials which are soluble in the hydrocarbon base oil in an amount not exceeding 1% by weight, within the temperature range where flattening of the V-T curve is desired; and it is further preferred that the polymeric material be soluble in the hydrocarbon base oil in the amount of 2 to 3% or more at elevated temperatures of the order of 300° F. This preferred upper limit of solubility ensures the desired V-T effect, while the preferred lower limit (at elevated temperatures) ensures ease of blending the polymeric material with the oil.

The object of producing a lubricant or the like having a flattened V-T curve in a selected range of temperatures may, therefore, be achieved by suitable choice of hydrocarbon base oil or of polymeric material, or both. Thus, with a given hydrocarbon base oil, ethyl cellulose of high (say, 48%) ethoxyl content is more oil-soluble than ethyl cellulose of lower (say, 45%) ethoxyl content; accordingly, the 48% ethyl cellulose will produce a lubricant having a flattened V-T curve in a region of lower temperatures than a lubricant compounded of the same base oil and 45% ethyl cellulose.

Similarly, by using a given ethyl cellulose, but in one case dispersing it in an aromatic type oil in which it is relatively highly soluble, and in another case dispersing it in a less aromatic oil in which it is less soluble, lubricants will be produced having flattened V-T curves in lower (aromatic oil) and higher (less aromatic oil) regions of temperature.

Similar principles are applicable in the case of other polymeric materials. Thus, ethyl cellulose is more oil-soluble than methyl cellulose of the same molar alkoxyl content, propyl cellulose is more oil-soluble than ethyl cellulose of the same molar alkoxyl content, etc.; accordingly, other conditions remaining the same, ethyl cellulose will produce flattening of the V-T curve at lower temperatures than methyl cellulose, propyl cellulose than ethyl cellulose, etc.

A still further and very important means of accomplishing the object of producing a lubricant or the like having a flattened V-T curve in a selected range of temperatures, resides in the use of a polar solvent capable of altering the solubility relationship of the hydrocarbon base oil and the polymeric material. This polar solvent is used in conjunction with the hydrocarbon base oil, polymeric material and dispersing agent.

These polar solvents are preferably of the type which act as mutual solvents for the hydrocarbon base oil and the polymeric material, thereby increasing the solubility of the polymeric material in the oil and causing the flattened portion of the V-T curve to shift to a region of lower temperatures. They may, however, be of a type which is soluble only or mainly in the hydrocarbon base oil, or which acts as a solvent only or mainly for the polymeric material.

Those polar solvents which act as mutual solvents for the hydrocarbon base oil and polymeric material, provide an additional advantage, in that they permit the use of ingredients which otherwise would be incompatible with one another. Thus, with a given hydrocarbon base oil, an alkyl cellulose (or other polymeric material) may be employed, in conjunction with a mutual solvent, which could not be stably dispersed in the given oil in the absence of the mutual solvent. Or, by using a mutual solvent and a given alkyl cellulose (or other polymeric material), a hydrocarbon base oil may be employed in which the given alkyl cellulose (or other polymeric material) could not be stably dispersed in the absence of the mutual solvent.

Examples of suitable polar solvents which act as mutual solvents are hydroxy compounds such as butyl Cellosolve (trade-name of Carbide & Carbon Chemicals Company for 2-butoxy ethanol), butyl lactate, butyl Carbitol (trade-name of Carbide & Carbon Chemicals Company for 2-[β-butoxy ethoxy]-ethanol), methyl cyclohexanol, $C_8$ aliphatic alcohols (e. g., 2-octanol and 2-ethyl hexanol-1), and highly branched $C_{14}$ and $C_{17}$ aliphatic secondary alcohols (e. g., 7-ethyl-2-methylundecanol-4 and 3,9-diethyl tridecanol-6). Other polar solvents than those of the hydroxy type may also be used. Preferably, however, the polar solvent is of the hydroxy type, has a low pour point (below —40° F.), is completely miscible with mineral lubricating oil and is a good solvent for ethyl cellulose (but has different solvent properties for mineral lubricating oil and ethyl cellulose), has a sufficiently low viscosity that it does not increase substantially the viscosity of the final product and is non-aromatic. Additional desirable properties of the polar solvent are high flash point (above 180° F.) and immiscibility with water. The aforesaid $C_8$ and $C_{14}$ alcohols provide the optimum combination of desirable properties.

Blends of two or more polar solvents may also be used, e. g., octanol-2 and p-tert. amyl cyclohexanol; octanol-2 and 2-ethyl hexanol-1.

These various polar solvents may be used in widely varying proportions, depending upon factors such as the nature of the base oil and of the polymeric material, the solubility of the latter in the former, the nature of the polar solvent and the desired degree of shifting of the flattened portion of the viscosity-temperature curve. Generally, however, the polar solvent will be used in amounts not less than about 5% nor more than about 20% by weight based on finished composition, including the polar solvent. About 5 to 15% of polar solvent is preferred. The proportions of hydrocarbon base oil, polymeric material, dispersing agent and stabilizer will usually be somewhat different when a polar solvent is used than when no polar solvent is present, but generally the proportions of oil, polymeric material, dispersing agent and stabilizer, relative to one another, will remain within the ranges indicated above, except that the polar solvent will displace a proportionate amount of hydrocarbon oil.

In compounding the products of this invention to include a polar solvent, the preferred procedure hereinabove described is advantageously used, modified as follows: In the first step, the dispersing agent and the polar solvent are dissolved in the hydrocarbon base oil by heating and stirring these ingredients together. If the polar solvent is so volatile that it would evaporate during the mixing and heating, the procedure may be carried out under pressure, or the base oil and dispersing agent may be mixed and heated to dissolve the dispersing agent in the oil, followed by cooling and addition of the polar solvent. After the blend of base oil, dispersing agent and polar solvent has been formed, the stabilizer and oxidation inhibitor, then the polymeric material, are added as described above. However, other compounding procedures may be employed.

A few words with regard to my theory of the action of the compositions of the invention, although not propounded by way of limitation of the invention claimed, nor advanced as the only possible explanation, will serve as a guiding principle to one skilled in the art, better to enable him to select ingredients to perform a specific job. According to this theory, within some range of temperatures the polymeric material is neither wholly dissolved in the hydrocarbon base oil, nor is it wholly in the dispersed phase. Within this range of temperatures, as the temperature of the composition is raised, more of the dispersed polymeric material dissolves in the oil and thickens it, thus opposing the normal thermal thinning effect. Conversely, as the temperature is lowered, dissolved polymeric material passes out of solution into the dispersed phase, and this thins the oil, thus opposing the normal thickening of the oil caused by decrease in temperature. But outside the range of temperatures where the polymeric material is partly dissolved in the oil and is partly in the dispersed phase (that is, when it is either entirely dissolved in the oil or is entirely in the dispersed phase), the polymeric material does not pass into and out of solution in the oil, according as the temperature of the oil is raised or lowered.

Hence it is, that a more oil-soluble polymeric material causes a flattening of the V-T curve at lower temperatures than a less oil-soluble polymeric material; the greater the solubility of the polymeric material in the base oil, the lower the range of temperatures in which the polymeric material passes into and out of solution and contributes its effect in opposing the normal thermal effects on viscosity. Similarly, a hydrocarbon base oil having greater solvent power for a given polymeric material, will (when blended with the polymeric material in accordance with the invention), produce an oil having a flattened V-T curve at lower temperatures than a hydrocarbon oil having less solvent power for the polymeric material. Similarly, a polar solvent which increases the solubility of a polymeric material in hydrocarbon oil will cause a flattening of the V-T curve at lower temperatures.

The following specific examples will serve further to illustrate the practice and advantage of the invention.

EXAMPLE 1

One part by weight of ethyl cellulose (Dow Chemical Co.'s "Standard Ethocel 250," containing 49.5% ethoxyl), 3 parts by weight of aluminum soap of hydrogenated fish oil fatty acids ("Metavis 540-B," the trade-name of a product of Metasap Chemical Co.) and 95.9 parts by weight of a mineral lubricating oil were mixed together and heated to 300° F. until a homogeneous blend was produced. Then 0.1 part by weight of ethylene glycol was added and stirred with the mixture at 300° F. for 10 minutes. The mineral lubricating oil was the product of refining a lubricating oil distillate from a wax-free, naphthenic type California petroleum. Specifications of this lubricating oil were as follows: A. P. I. gravity, 22.5°; pour point, —40° F.; aniline point 145° F.

Viscosities (S. S. U.) of the blend of Example 1 and, for comparison, of the base oil and of a conventional 100 V. I. oil, are given in Table I below:

Table I

| | Base oil | Blend | 100 V. I. Oil |
| --- | --- | --- | --- |
| 100° F | 105 | 524 | 524 |
| 130° F | 63.2 | 299 | 235 |
| 210° F | 37.9 | 270 | 65.5 |

The composition of Example 1 is a cloudy liquid at room temperature. It is stable on standing, no separation of the ingredients occurring over long periods of time. Also, it is stable toward milling action; thus, circulation through a colloid mill set at close clearance, for a period of time equivalent to six passes, caused the following changes in viscosity:

Table II

| Viscosity, S. S. U. at— | Before Milling | After Milling |
| --- | --- | --- |
| 100° F | 524 | 499 |
| 130° F | 299 | 322 |
| 210° F | 270 | 246 |

The degree of improvement represented by the composition of Example 1 is best shown by reference to Figure 1 of the drawings, in which abscissae represent temperature in degrees Fahrenheit and ordinates represent viscosities in Saybolt Seconds Universal. The scale is that of ASTM Standard Viscosity-Temperature Chart (D341-39).

At this point, it should be noted that the oils of the invention are, as stated, preferably made from mineral oils of low viscosity, about 30 to 110 S. S. U. at 100° F., and that these light mineral oils, themselves, undergo relatively small changes of viscosity, with changes of temperature, when compared with more viscous oils. Thus, the base oil of Example 1 changed in viscosity by 67 S. S. U. units between 100° F. and 210° F. while the blend of the invention, compounded from this base oil, changed by 254 S. S. U. units. Percentage-wise, and taking viscosities at 100° F. as the basis of calculation, the base oil decreased in viscosity by 64% and the blend, by 49%. This, however, is not the proper basis of comparison, which is provided by comparing the viscosity figures of the blend with those of a conventional 100 V. I. oil having, at some point in the temperature range under consideration, the same viscosity as the blend. As will be seen, the improvement of the blend over a 100 V. I. oil having the same viscosity at 100° F., is very marked. The constant viscosity characteristics of the blend are of an entirely different order than those of a conventional 100 V. I. oil.

The ingredients and properties of still further compositions of the invention are given in Table III, below:

Table III

| Composition (weight percent) | Blend Number | | | | |
|---|---|---|---|---|---|
| | 1 | 2 | 3 | 4 | 5 |
| Hercules ethyl cellulose—N-50 (47.6% ethoxyl content) | | 2.0 | 2.0 | | 2.0 |
| Hercules ethyl cellulose—T-100 (49.4% ethoxyl content) | 2.0 | | | 2.0 | |
| Aluminum dioleate | | 3.0 | 2.25 | | |
| Aluminum soap of hydrogenated fish oil fatty acids (Metavis 540-B) | 3.0 | | 0.75 | | 3.0 |
| Aluminum stearo-oleate (equal parts of stearate and oleate) | | | | 3.0 | |
| Glyceryl monostearate | 0.2 | 0.2 | 0.2 | 0.2 | 0.2 |
| Mineral oil of Example 1 | 94.8 | 94.8 | 94.8 | 94.8 | 1 94.8 |
| | 100.0 | 100.0 | 100.0 | 100.0 | 100.0 |
| Viscosity (S. S. U.): | | | | | |
| 100° F | 268.2 | 23,030 | 503 | 493 | 110 |
| 130° F | 209.2 | 31,920 | 403 | 529 | 98 |
| 210° F | 270.8 | 21,080 | 754 | 556 | 108 |
| Pour Point, °F | +10 | <0 | −50 | −10 | +10 |

1 This mineral oil was a blend of sulfuric acid treated distillates from a California wax-free napthenic type crude. The viscosity of the blend was 57.7 S. S. U. at 100° F. and the aniline point was 140° F. This base oil was prepared by selecting a distillate of the approximate viscosity desired in the final oil and treating this lightly with sulfuric acid followed by neutralization with sodium hydroxide to yield the desired aniline point. The oils were then washed and finally given a light clay treatment.

EXAMPLE 2

Two parts of ethyl cellulose (Hercules N-50 grade, 47% ethoxyl), 1.5 parts of aluminum oleate (a mixture of di- and trioleate), 74.8 parts of a mineral lubricating oil and 20 parts of 2-butoxy ethanol were mixed together and heated to 150° F. until a homogeneous blend was produced. Then 0.2 part of glyceryl monostearate was added and stirred with the mixture at 150° F. for 10 minutes. The mineral lubricating oil was obtained from the same petroleum by the same method as in Example 1 and had the following specifications: Aniline point, 131° F.; A. P. I. gravity, 30.5°; pour point, below −70° F.

Viscosities (S. S. U.) of the blend of Example 2 and, for comparison, of the base oil and of a conventional 100 V. I. oil, are given in Table IV, below:

Table IV

| | Base Oil | Blend | 100 V. I. Oil |
|---|---|---|---|
| 0° F | | 588 | 7,500 |
| 100° F | 107 | 150 | 150 |
| | 36.3 | | |

Still further examples of compositions of the invention which include a polar solvent are shown in Table V, below:

Table V

| Composition (Weight Per Cent) | Blend Number | | | | |
|---|---|---|---|---|---|
| | 6 | 7 | 8 | 9 | 10 |
| Hercules ethyl cellulose—N-50 (47.6% ethoxyl content) | | 2.0 | | | 1.0 |
| Hercules ethyl cellulose—T-100 (49.4% ethoxyl content) | 2.0 | | 2.0 | 2.0 | |
| Aluminum trioleate | 1.5 | 1.5 | 3.0 | 1.5 | 3.0 |
| Glyceryl monostearate | 0.2 | 0.2 | 0.2 | 0.2 | |
| 2-(β-butoxy ethoxy)-ethanol | 20.0 | | | | |
| 2-butoxy ethanol | | 20.0 | | 10.0 | 1.0 |
| Butyl lactate | | | 20.0 | | |
| Mineral oil 1 (132° F. aniline point) | 76.3 | 76.3 | 74.8 | 86.3 | 95.0 |
| | 100.0 | 100.0 | 100.0 | 100.0 | 100.0 |
| Viscosity (S. S. U.): | | | | | |
| 0° F | 851.2 | 588.3 | 743.7 | 351.7 | 9364 |
| 35° F | | | | | 1472 |
| 68° F | | | | | 1303 |
| 100° F | 214.6 | 150.3 | 222.5 | 194 | 1220 |
| 130° F | | | | | 1144 |
| 250° F | | | | | 237.2 |

1 This mineral oil was a blend of sulfuric acid treated distillates from a California wax-free naphthenic type crude. The viscosity of the blend was 57.7 S. S. U. at 100° F. and the aniline point was 140° F. This base oil was prepared by selecting a distillate of the approximate viscosity desired in the final oil and treating this lightly with sulfuric acid followed by neutralization with sodium hydroxide to yield the desired aniline point. The oils were then washed and finally given a light clay treatment.

In Figs. II and III of the drawings are shown V-T curves for several of the compositions of Tables III and V and, for comparison, of one of the base oils and a conventional 100 V. I oil. In these drawings, abscissae represent temperatures in degrees Fahrenheit while ordinates represent viscosities in Saybolt Universal Seconds. The scale is that of ASTM Standard Viscosity-Temperature Chart. Arabic numerals applied to the different curves indicate that the curves so numbered correspond to similarly numbered compositions in Tables III and V, above.

Some further information regarding selection and blending of materials to produce the compositions of the invention are provided below.

If ethyl cellulose is used as the polymeric material, it is preferably a product of such molecular weight as to have an intrinsic viscosity of about 0.5 to 2.6, most advantageously about 1.1 to 1.8, in a mixture of 80 parts by volume of C. P. toluene and 20 parts by volume of C. P. ethanol. Intrinsic viscosities can be calculated by the formula $$V = \left(\frac{\ln V_r}{C}\right)_{C \to 0}$$

in which $V$ is the intrinsic viscosity, $\ln V_r$ is the natural logarithm of $V_r$, $V_r$ is the viscosity of the solution of polymer relative to that of the solvent and $C$ is the concentration of the polymer in per cent by weight. The subscript, $C \to 0$, indicates that the intrinsic viscosity, $V$, is obtained by extrapolating $\ln V_r/C$ from finite concentrations to zero concentration of polymer. This method is described in Kraemer and Lansing in Journal of Physical Chemistry, vol. 39, page 153.

Aluminum soaps have been found to be the best dispersing agents, and of these, the normal (or "tri") soaps, such as aluminum trioleate, produce the best results. These "tri" soaps are actually mixtures of tri- and di-soaps made from stoichiometric quantities of reactants, calculated to give the tri-soap. High purity of the soap, especially freedom from inorganic salts, results in a product less susceptible to separation of the components at elevated temperatures. The type of acid radical in the soap has a marked influence on pour point of the product; thus stearic acid soaps cause the product to have a relatively high pour point. Aluminum trioleate yields a product of especially low pour point.

Among the stabilizers, ethylene glycol tends to increase the viscosity level of the product. Glyceryl monostearate and monoricinoleate lower the viscosity level of the product and are also superior in preventing separation of the components.

Hydrocarbon base oils of too high aromaticity may cause some gelling of the product. More viscous base oils require a higher aromaticity than less viscous oils to provide sufficient solvent power for the polymeric material.

As stated, the proportions of the various ingredients of the compositions of the invention may vary within rather wide limits. In any given instance, however, the proportions used are important. Thus, too much or too little of some particular ingredient may not produce the desired effect on viscosity, or this effect may not be as great as desired or it may not occur in the desired range of temperatures. However, with the foregoing and the following supplemental instructions and with the specific examples hereinabove provided, one skilled in the art can determine the proper proportions to use in a given case.

It has been found, for example, that use of too little ethyl cellulose produces correspondingly less effect on viscosity whereas use of too much ethyl cellulose may cause phase separation. Too little dispersing agent allows phase separation; too much may cause an undesirably large increase of viscosity, or even gelling of the final product. Too little of the stabilizer allows phase separation, especially at elevated temperatures whereas if too much is used, it may not wholly dissolve or it may unduly raise the viscosity of the final product at low temperatures.

More specifically, where ethyl cellulose is dispersed in an aromatic type mineral lubricating oil, no polar solvent being used, it is best not to use more than about 2% of ethyl cellulose. If a polar solvent is used, having mutual solvent properties for the oil and the ethyl cellulose, it is preferred not to use more than about 3% of ethyl cellulose. In either case, if more than 2% of ethyl cellulose is used without a polar solvent, or if more than 3% is used with a polar solvent, the final product may have an undesirably high viscosity at low temperatures.

About 1 to 3% of dispersing agent, such as aluminum trioleate, has been found to be best with ethyl cellulose as the polymeric material. Ethyl cellulose of lower ethoxyl content requires a greater quantity of dispersing agent, usually about 50% more. The maximum quantity of dispersing agent is limited by its tendency to increase the viscosity of the final product at low temperatures.

Generally, about 5 to 15% of polar solvent (of the mutual solvent type) will be used, preferably no more than about 10% where the polar solvent is viscous (otherwise, an unduly high viscosity at low temperatures may result). If a non-viscous polar solvent (mutual solvent type) is used, a higher concentration of ethyl cellulose is required to produce the desired effect on viscosity. This, in turn, may lead to a product of unduly high viscosity at low temperatures.

It will be understood that these remarks regarding optimum materials, proportions, etc., are provided to instruct one skilled in the art how to prepare compositions having the best possible combination of properties, such as the greatest possible flattening of the V-T curve, the highest resistance to phase separation, low pour point and low viscosity at low temperatures. The invention, however, contemplates and includes compositions having less than the optimum combination of desirable properties. Thus, where only a moderate flattening of the V-T curve is required, or where phase separation at high temperatures, high viscosity at low temperatures or high pour point is allowable, or where all or several of these properties are allowable, compositions so characterized may be produced in accordance with the principles of and are within the scope of this invention.

I claim:

1. A normally liquid composition of lubricating viscosity having superior viscosity-temperature characteristics, which consists essentially by weight of about 85 to 99 per cent of a hydrocarbon lubricating oil; about 0.5 to 6 per cent of a thermoplastic polymeric material dispersed in said lubricating oil, said thermoplastic material having recurring polar groups and being substantially insoluble in the lubricating oil at normal atmospheric temperatures; and about 0.5 to 6 per cent as dispersing agent of an oil-soluble soap material selected from the group consisting of aluminum and magnesium soaps and mixtures thereof.

2. A composition substantially as described in claim 1, wherein the dispersing agent is an aluminum soap of a high molecular weight fatty acid.

3. A composition substantially as described in claim 1, wherein the dispersing agent is a magnesium soap of a high molecular weight fatty acid.

4. A composition substantially as described in claim 1, wherein said hydarcarbon oil is a petroleum lubricating oil.

5. A composition substantially as described in claim 1, wherein said polymeric material is an ether of cellulose and a low molecular weight alcohol.

6. A lubricating oil composition having superior viscosity-temperature characteristics, consisting essentially by weight of about 85 to 99 per cent of a petroleum lubricating oil; about 0.5 to 6 per cent of an ether of cellulose and a low molecular weight aliphatic alcohol, said ether being substantially insoluble in said petroleum oil at normal atmospheric temperatures; and about 0.5 to 6 per cent as dispersing agent of material selected from the group consisting of aluminum and magnesium soaps.

7. A composition substantially as described in claim 6, wherein the dispersing agent is an aluminum soap.

8. A composition substantially as described in claim 6, wherein the dispersing agent is a magnesium soap.

9. A lubricating oil composition having superior viscosity-temperature characteristics, consisting essentially by weight of about 85 to 99 per cent of a petroleum lubricating oil having a viscosity between about 30 and 110 S. S. U. at 110° F., and an aniline point between about 130 and 160° F.; about 0.5 to 6 per cent of ethyl cellulose having an intrinsic viscosity between about 1.1 and 1.8 in a mixture by volume of 80 parts toluene and 20 parts ethanol, dispersed in said petroleum oil;

and as dispersing agent about 0.5 to 6 per cent of an aluminum soap of a high moleculer weight fatty acid.

10. A composition substantially as described in claim 9, wherein the soap is a normal aluminum soap.

FRANK A. LEYDA.

REFERENCES CITED

The following references are of record in the file of this patent:

UNITED STATES PATENTS

| Number | Name | Date |
|---|---|---|
| 1,882,816 | Hagedorn | Oct. 18, 1932 |
| 2,020,703 | Schumann et al. | Nov. 12, 1935 |
| 2,072,120 | Mikeska et al. | Mar. 2, 1937 |
| 2,079,783 | Wiezevich | May 11, 1937 |
| 2,261,577 | Batchelder | Nov. 4, 1941 |
| 2,301,795 | Proell | Nov. 10, 1942 |
| 2,358,833 | Smith et al. | Sept. 26, 1944 |